(12) United States Patent
Cho et al.

(10) Patent No.: US 6,989,932 B2
(45) Date of Patent: Jan. 24, 2006

(54) METHOD OF MANUFACTURING MICRO-LENS

(75) Inventors: Eun-hyoung Cho, Seoul (KR); Myung-bok Lee, Suwon-si (KR); Jin-seung Sohn, Seoul (KR); Mee-suk Jung, Suwon-si (KR); Hae-sung Kim, Hwasung-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/897,116

(22) Filed: Jul. 23, 2004

(65) Prior Publication Data
US 2005/0018962 A1 Jan. 27, 2005

(30) Foreign Application Priority Data
Jul. 24, 2003 (KR) .......................... 10-2003-51116
Apr. 16, 2004 (KR) .......................... 10-2004-26246

(51) Int. Cl.
*G02B 27/10* (2006.01)
*G02B 7/02* (2006.01)
*B29D 11/00* (2006.01)

(52) U.S. Cl. ...................... 359/619; 359/811; 359/819; 264/1.7; 264/1.38; 264/2.5

(58) Field of Classification Search ................ 359/811, 359/819, 619; 264/1.7, 2.4, 2.5, 2.7, 1.32, 264/1.36, 1.38; 65/374.12; 385/33
See application file for complete search history.

(56) References Cited

U.S. PATENT DOCUMENTS

| | | | | |
|---|---|---|---|---|
| 4,179,484 A | * | 12/1979 | Neefe | 264/2.5 |
| 5,529,728 A | * | 6/1996 | Buazza et al. | 264/1.38 |
| 5,932,151 A | * | 8/1999 | Schubert | 264/1.38 |
| 6,074,579 A | * | 6/2000 | Greshes | 264/1.7 |
| 6,618,201 B2 | * | 9/2003 | Nishikawa et al. | 359/619 |
| 2004/0211222 A1 | * | 10/2004 | Hosoe | 65/374.12 |

* cited by examiner

*Primary Examiner*—Loha Ben
(74) *Attorney, Agent, or Firm*—Sughrue Mion, PLLC

(57) ABSTRACT

A method of manufacturing a micro-lens in which at least one first lens is first molded using a compression technique. A lens holder is produced including a hole in which the first lens is seated. A second lens is formed on a bottom surface of the lens holder. The first and second lenses are combined by aligning the first and second lenses along an optical axis in the hole of the lens holder. Thus, a hybrid micro-lens composed of a diffractive lens and a refractive lens, along with an array of the hybrid micro-lenses are easily manufactured.

18 Claims, 11 Drawing Sheets

METHOD OF MANUFACTURING MICRO-LENS

BACKGROUND OF THE INVENTION

This application claims the benefits of Korean Patent Application Nos. 2003-51116 and 2004-26246, filed on Jul. 24, 2003, and Apr. 16, 2004, respectively, in the Korean Intellectual Property Office, the disclosures of which are incorporated herein in their entirety by reference.

1. Field of the Invention

Methods consistent with the present invention relate to manufacturing a hybrid micro-lens and an array of the hybrid micro-lenses using a machining process and either a photolithographic process or a nano-imprinting technique, for example.

2. Description of the Related Art

Examples of a conventional method of manufacturing a micro-lens array include manufacturing a single micro-lens using a machining process, manufacturing a micro-lens array using a photolithography process using a photoresist, and the like.

FIG. 1 is a schematic diagram for illustrating a conventional method of manufacturing a single micro-lens using a machining process. Referring to FIG. 1, to form a single micro-lens, an upper mold 11 and a lower mold 13 are first processed in the shape of a surface of the single micro-lens. A ball (BL)- or gob (G)-shaped lens is inserted into the space between the upper and lower molds 11 and 13 and compressed at a high temperature, thereby forming the single micro-lens. A lens used in a machining process is usually made of glass. A plastic lens is manufactured by injection molding using a precise mold manufactured by a machining process. Such a machining process can achieve precise surface processing. However, the machining process has a limit in processing ultra-small lenses and forming a lens array. Hence, the machining process is used for optical information storage media and some optical communication lenses, which require a high numerical aperture.

FIGS. 2A through 2E are cross-sectional views illustrating a conventional method of manufacturing a micro-lens array using photolithography. First, as shown in FIG. 2A, a substrate 21 is coated with photoresist 23. As shown in FIG. 2B, a mask M is positioned over the photoresist 23, which is exposed to ultraviolet rays. Thereafter, exposed portions of the photoresist 23 are developed and etched, thereby forming a photoresist pattern 23a shown in FIG. 2C. When heat is applied to the photoresist pattern 23a and causes reflow, the photoresist pattern 23a is transformed into a photosensitive lens 23b having a spherical shape as shown in FIG. 2D. Thereafter, the refractive index of the photosensitive lens 23b is adjusted using an ion exchanging technique as shown in FIG. 2E.

The conventional method of FIGS. 2A through 2E has difficulty in obtaining a high sag necessary for a high numerical aperture and performing aspherical curved surface processing required for aberration correction. Also, the conventional method of FIGS. 2A through 2E has difficulty in manufacturing a large aperture lens with a diameter of 500 µm or greater.

SUMMARY OF THE INVENTION

The present invention provides a method of manufacturing a hybrid micro-lens and a micro-lens array using both a machining process and a photolithographic process.

According to an exemplary embodiment, a method of manufacturing a micro-lens includes: molding at least one first lens using a compression technique; producing a lens holder including a hole on which the first lens is seated and a second lens formed on a bottom surface; and combining the first and second lenses by aligning the first and second lenses along an optical axis in the hole of the lens holder.

The operation of molding the at least one first lens includes the sub-operations of: preparing for a mold having the same surface shape as a shape of the first lens; and pressing down a first lens forming material on the mold and molding the first lens.

The first lens may have one surface which is spherical or aspherical and the other surface which is plane.

An exemplary operation of producing the lens holder comprises the operations of: forming a first etching area by coating an upper surface of the substrate with a photoresist and by patterning the photoresist; forming the hole by coating a bottom surface of the substrate with a photoresist, by patterning the photoresist, and by forming a second etching area leading to the first etching area; and bonding a bottom plate of the hole to the bottom surface of the substrate so that the second etching area is on the bottom surface of the substrate.

In the operation of producing the lens holder, align marks may be formed on the upper surface of the substrate and in the bottom plate.

The operation of producing the lens holder further includes the sub-operation of polishing the bottom plate after the bottom plate of the hole is formed.

It is also contemplated that the operation of producing the lens holder includes the sub-operations of: forming the second lens by coating the bottom plate with a UV curing material, by pressing down the UV curing material on a polymer mold, and hardening the UV curing material with applied UV rays; and inserting the first lens into the hole such that the first and second lenses are aligned along an optical axis.

The operation of producing the lens holder includes: forming the second lens by coating the bottom plate with a polymer, by pressing down the polymer on a template having a diffractive surface, and hardening the UV curing material with applied UV rays; and inserting the first lens into the hole such that the first and second lenses are aligned along an optical axis.

The bottom plate may be formed of transparent glass.

The UV curing material may have a diffractive index of no less than 1.5.

The UV curing material may have a light transmissivity of no less than 95%.

It is further contemplated that the operation of producing the lens holder comprises the sub-operations of: preparing for a lens holder mold including upper and lower molds; injection molding a lens holder having a hole by implanting thermoplastic resin into a space between the upper and lower molds; and forming the second lens on a surface opposite to a surface on which the hole is formed.

The operation of producing the lens holder comprises the sub-operations of: preparing for a lens holder mold including an upper mold and a lower mold that has the same surface as a surface of the second lens; and injection molding a lens holder having a hole by implanting thermoplastic resin into a space between the upper and lower molds. The upper mold of the lens holder includes a step portion on which the first lens is seated. Also, the first lens may be a refractive lens, and the second lens a diffractive lens.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF ILLUSTRATIVE, NON-LIMITING EMBODIMENTS OF THE INVENTION

A micro-lens manufacturing method according to an embodiment of the present invention will now be described in detail with reference to the accompanying drawings. In an exemplary embodiment, a plurality of refractive lenses are formed using a machining process, a plurality of diffractive lenses are formed using a photolithographic process or a nano-imprinting process, and the refractive lenses and the diffractive lenses are combined together.

Figure 1:
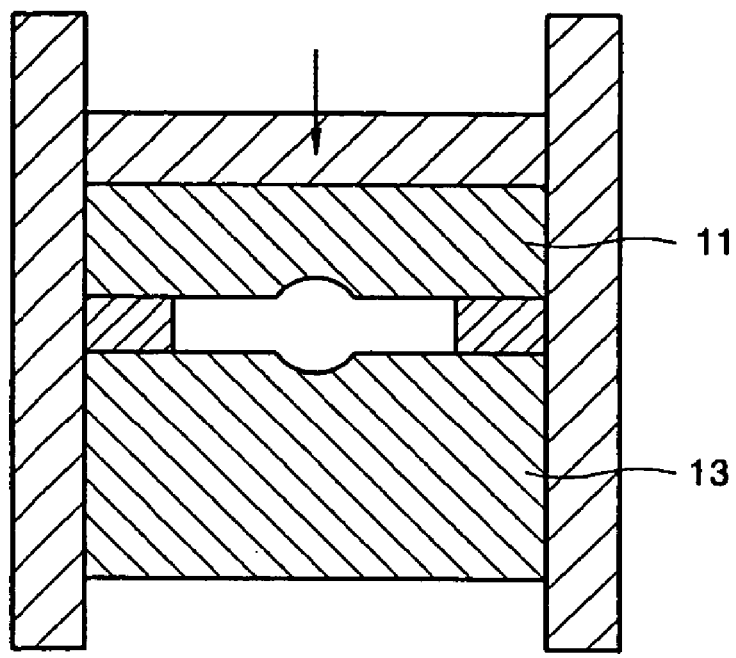
FIG. 1 is a schematic diagram for illustrating a conventional method of manufacturing a single micro-lens using a machining process.
Figure 1:
Figure 1:
Figure 2A:
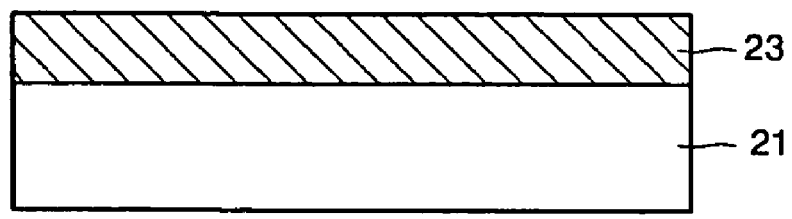
FIG. 2A through 2E are cross-sectional views illustrating a conventional method of manufacturing a micro-lens array using a micro-fabrication technique.
Figure 2B:
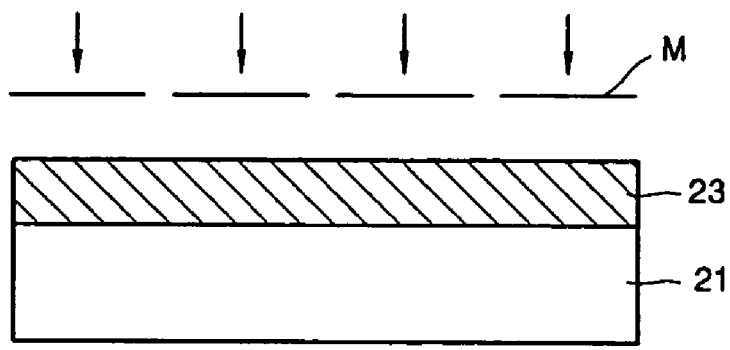
Figure 2C:
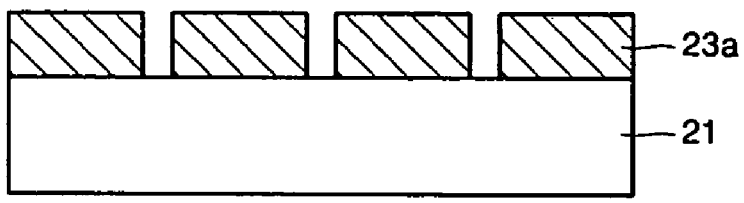
Figure 2D:
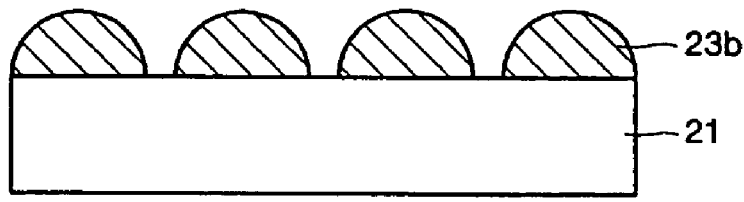
Figure 2E:
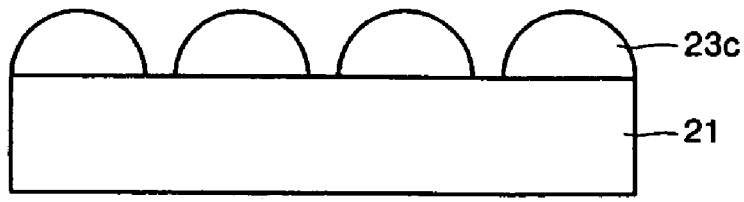
Figure 3A:
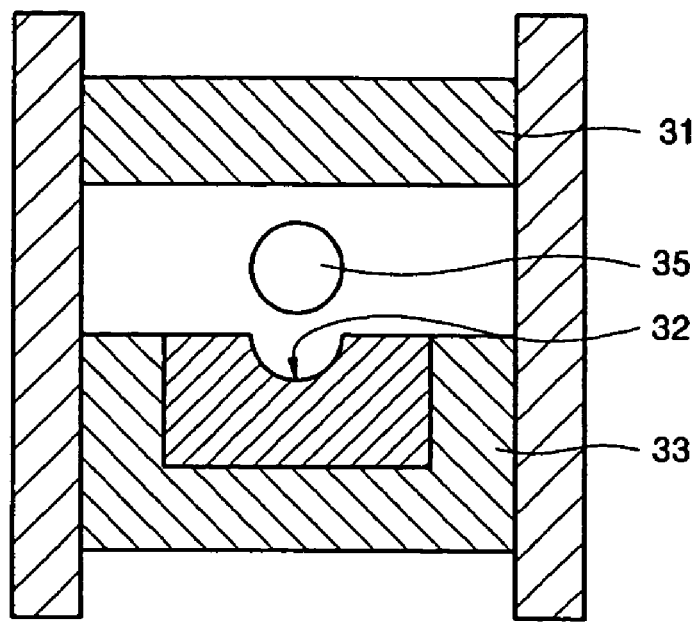
FIGS. 3A through 3C are schematic diagrams for illustrating a method of forming a plurality of refractive lenses, according to an exemplary embodiment of the present invention.
Figure 3B:
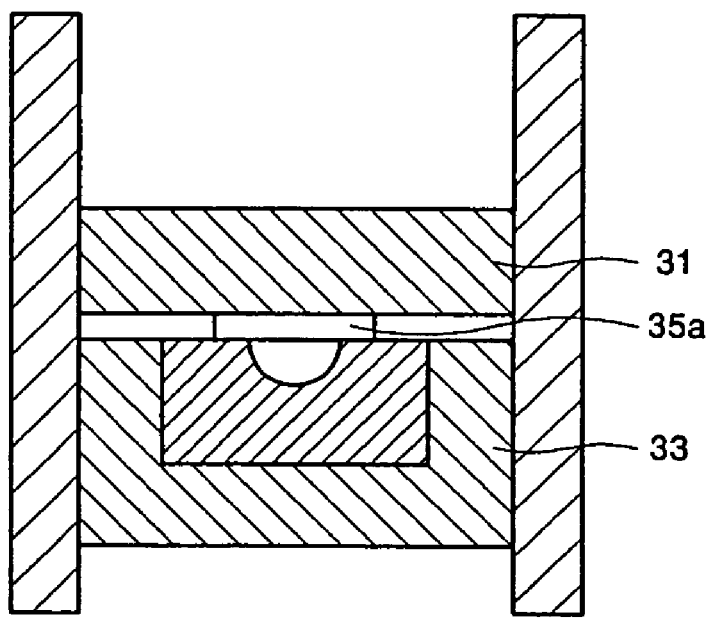
Figure 3C:

FIGS. 3A through 3C are schematic diagrams for illustrating a method of forming a highly precise micro-lens with a high numerical aperture using a machining process, according to an embodiment of the present invention. First, a highly precise metal mold is formed using a diamond rotation machine as shown in FIG. 3A. An upper mold 31 is formed to be flat, and a lower mold 33 has a groove 32, which has a spherical or aspherical surface so that a lens forming material 35 in a fused state is solidified to have a spherical or aspherical shape. As shown in FIG. 3B, the lens forming material 35 is put in the groove 32, and the upper mold 31 is pressed down on the lower mold 33 at a high temperature so that a convex-plane lens 35a with a plane bottom surface is formed. As shown in FIG. 3C, the convex-plane lens 35a, which has a spherical or aspherical top surface and the plane bottom surface, is manufactured through compression molding. The material 35 forming the convex-plane lens 35a is generally glass.

Figure 4A:
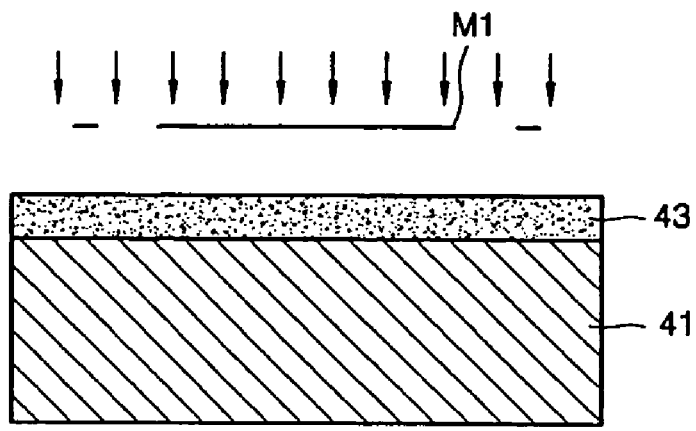
FIGS. 4A through 4E are cross-sectional views illustrating a method of manufacturing a lens holder using the micro-fabrication technique, according to an exemplary embodiment of the present invention.
Figure 4B:
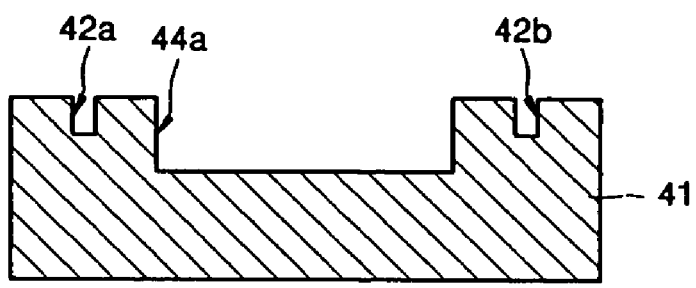

FIGS. 4A through 4E are cross-sectional views illustrating a method of manufacturing a lens holder array using a photolithographic technique, according to an exemplary embodiment of the present invention. The lens holder array is used to extend the micro-lens manufactured through the method of FIGS. 3A through 3C to a micro-lens array. First, as shown in FIG. 4A, a silicon substrate 41 is coated with a photoresist 43, a mask M1 is located over the photoresist 43, and then the photoresist 43 is exposed to light. Thereafter, developing and etching are performed to remove unexposed portions of the silicon substrate 41, so the silicon substrate 41 is patterned as shown in FIG. 4B. The performed etching is inductive coupled plasma-reactive ion etching (ICP-RIE).

Figure 4C:
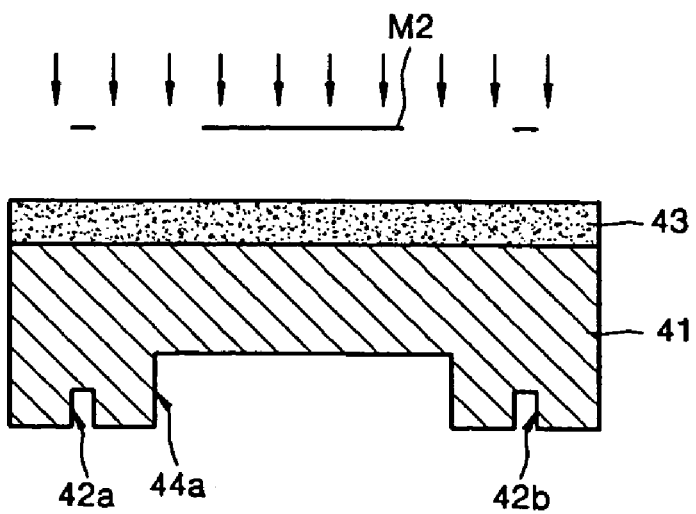
Figure 4D:
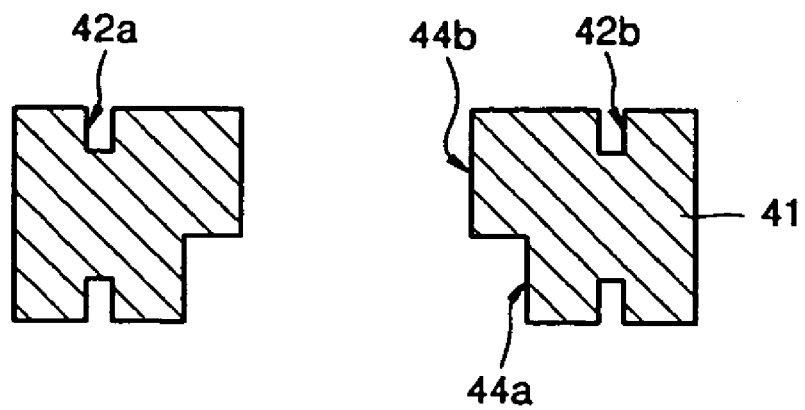
Figure 4E:
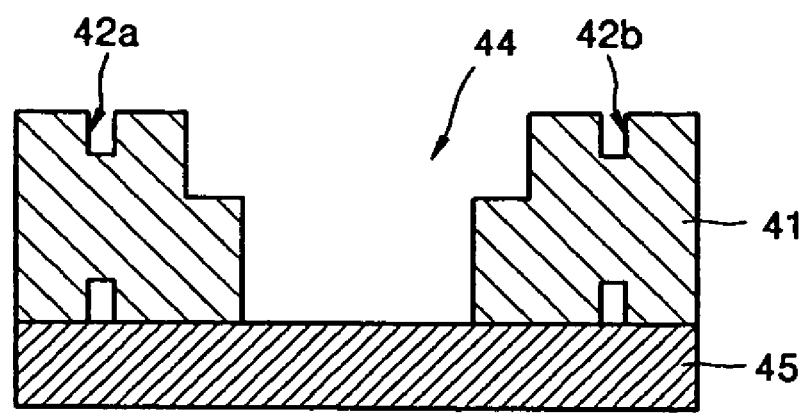

Thereafter, as shown in FIG. 4C, the silicon substrate 41 is turned upside down, and the bottom surface of the silicon substrate 41 is coated with the photoresist 43. Then, a mask M2 is located over the photoresist 43, and the photoresist 43 is exposed to light. In FIG. 4D, first and second etching areas 44a and 44b are penetrated through each other using developing and etching processes. In FIG. 4E, a glass substrate is anodic-bonded to the bottom surface of the silicon substrate 41 such as to serve as a bottom plate 45 of a hole 44 formed by penetrating the first and second etching areas 44a and 44b. Preferably, but not necessarily, the glass substrate is made of a transparent material. If required, chemical mechanical polishing (CMP) may be performed to adjust the thickness of the bottom plate 45.

Figure 5A:
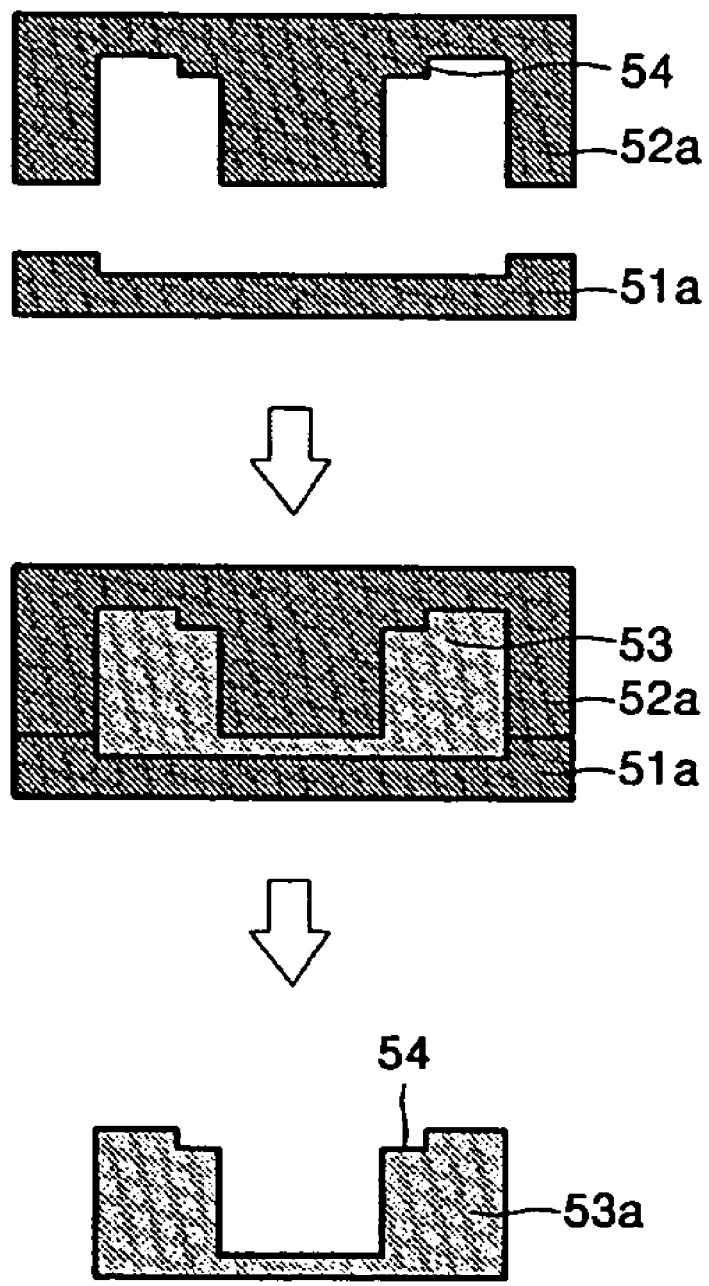
FIGS. 5A through 5C are cross-sectional views illustrating a method of manufacturing a lens holder using injection molding, according to an exemplary embodiment of the present invention.
Figure 5B:
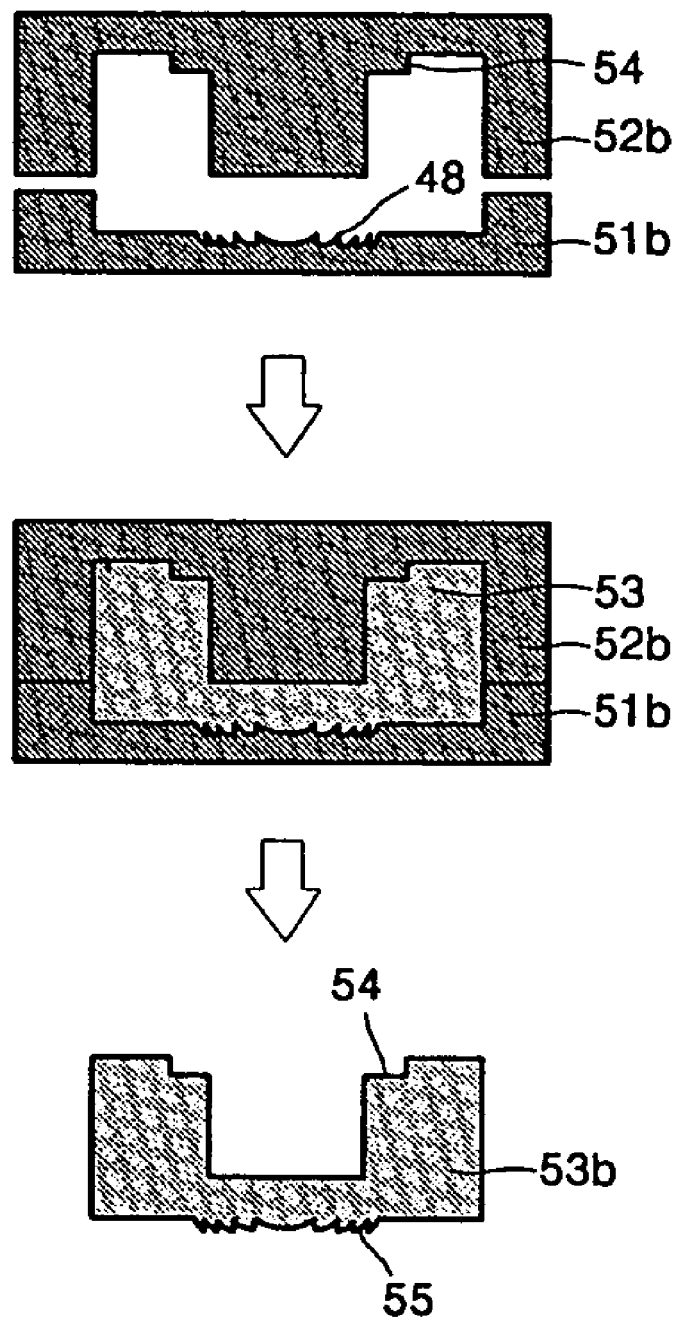
Figure 5C:
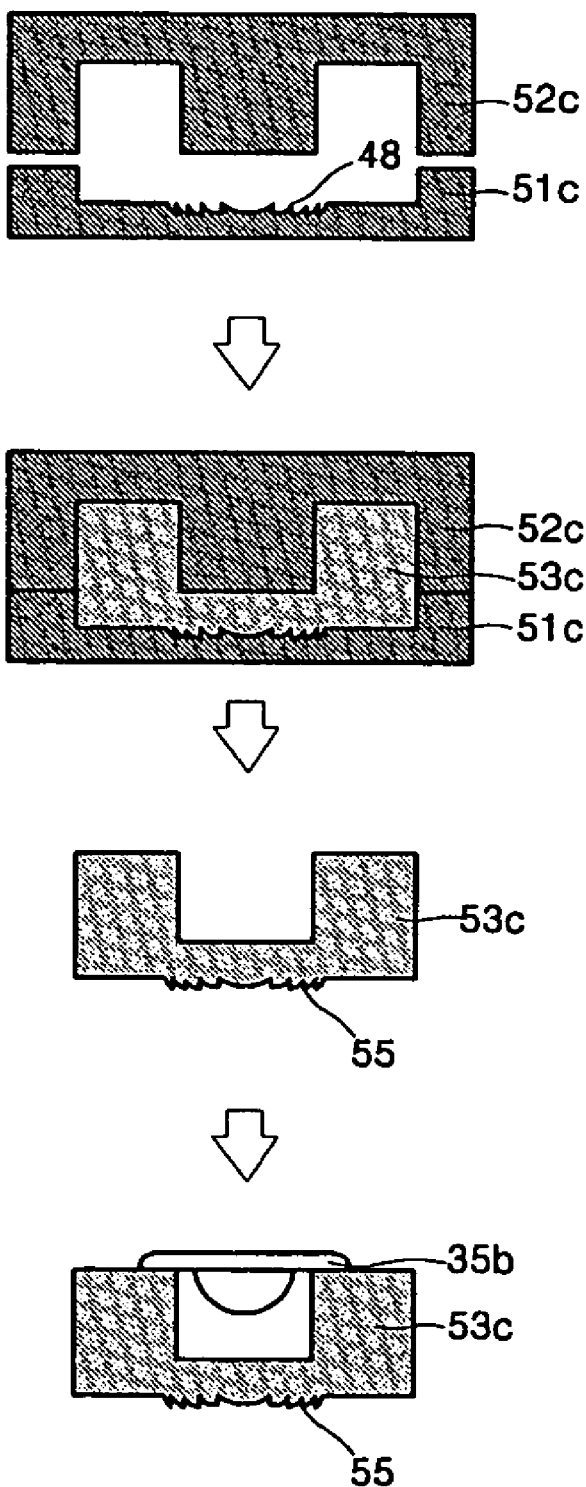

FIGS. 5A through 5C are cross-sectional views illustrating a method of manufacturing a lens holder using injection molding instead of using the photolithography process shown in FIGS. 4A through 4E, according to an embodiment of the present invention. Referring to FIG. 5A, lower and upper metal molds 51a and 52a are prepared. The lower and upper metal molds 51a and 52a are precisely shaped in accordance with a desired dimension and each have a step portion 54 to align refractive lenses. Thermoplastic resin, such as polymethylmethacrylate (PMMA), is implanted into the space between the lower and upper metal molds 51a and 52a and then pressed down. When the lower and upper metal molds 51a and 52a are separated from the implanted thermoplastic resin, a lens holder 53a having step portions 54 is obtained.

FIG. 5B illustrates an exemplary method of manufacturing a lens holder including a diffractive lens by forming a diffractive surface 48 in a lower mold 51b. The diffractive surface 48 of the lower mold 51b is formed using a precise machining process upon manufacture of the lower mold 51b. Thermoplastic resin, such as polymethylmethacrylate (PMMA), is implanted into the space between the lower mold 51b and an upper mold 52b and is then pressed down. Accordingly, a lens holder 53b including step portions 54 and a diffractive lens 55 can be obtained.

FIG. 5C illustrates a method of manufacturing a lens holder including the diffractive surface 48 but not including the step portions 54 in contrast with FIGS. 5A and 5B. The diffractive surface 48 of a lower mold 51c is formed using a precise machining process upon manufacture of the lower mold 51c. Thermoplastic resin, such as polymethylmethacrylate (PMMA), is implanted into the space between the lower mold 51c and an upper mold 52c and then pressed down. Accordingly, a lens holder 53c including the diffractive lens 55 can be obtained. A plurality of micro-lenses 35b are precisely aligned and bonded to the lens holder 53c.

Figure 6A:
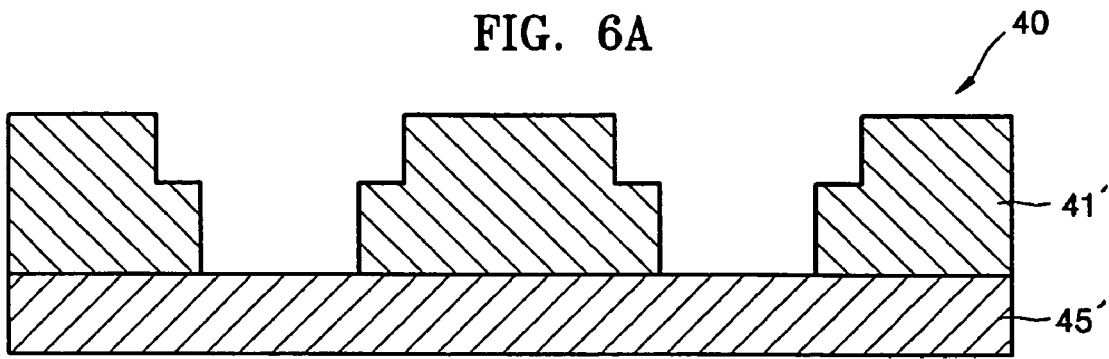
FIGS. 6A through 6E are cross-sectional views illustrating a method of manufacturing a diffractive lens using photolithography and a method of combining a diffractive lens and a refractive lens, according to an exemplary embodiment of the present invention.
Figure 6B:
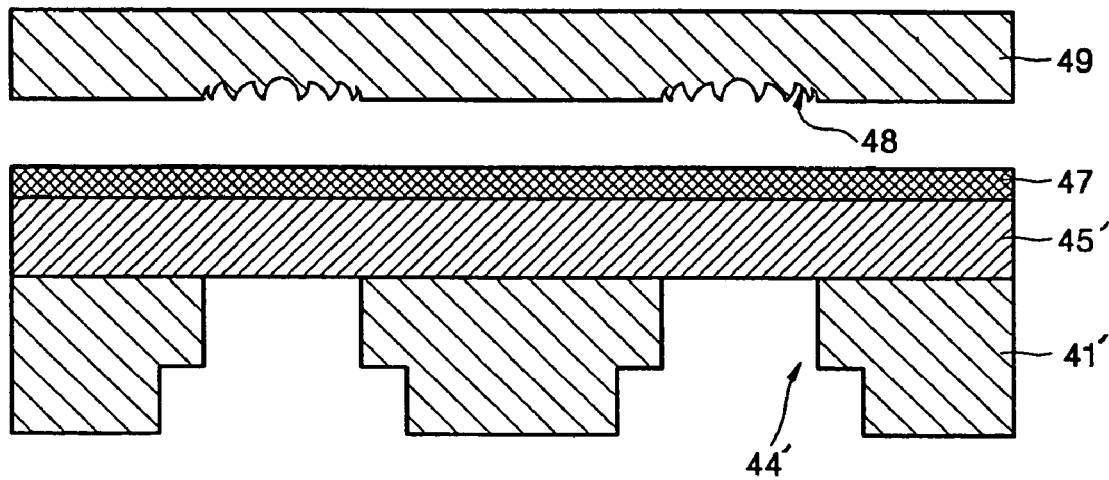
Figure 6C:
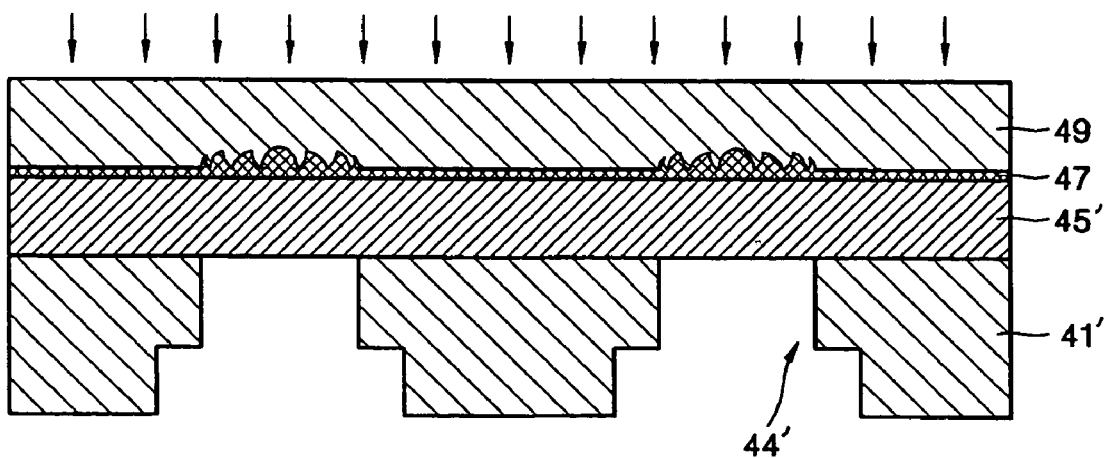
Figure 6D:
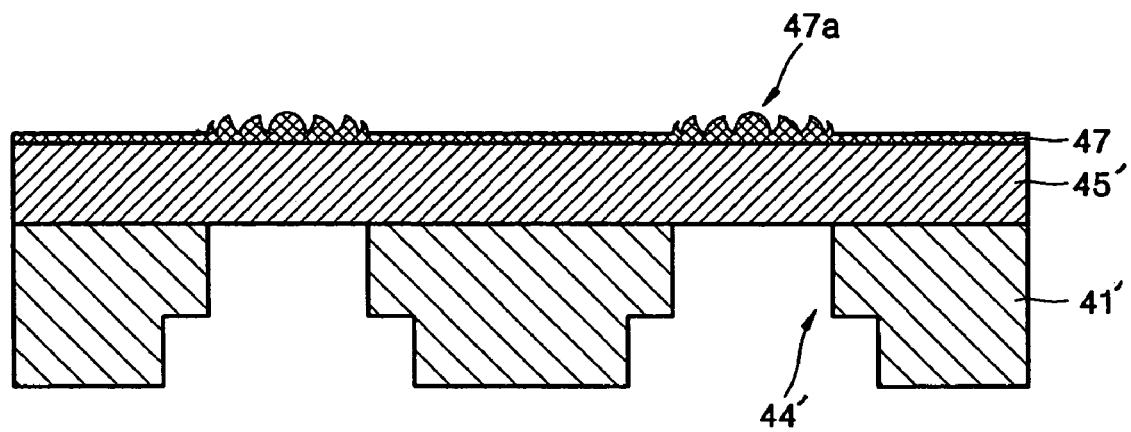
Figure 6E:
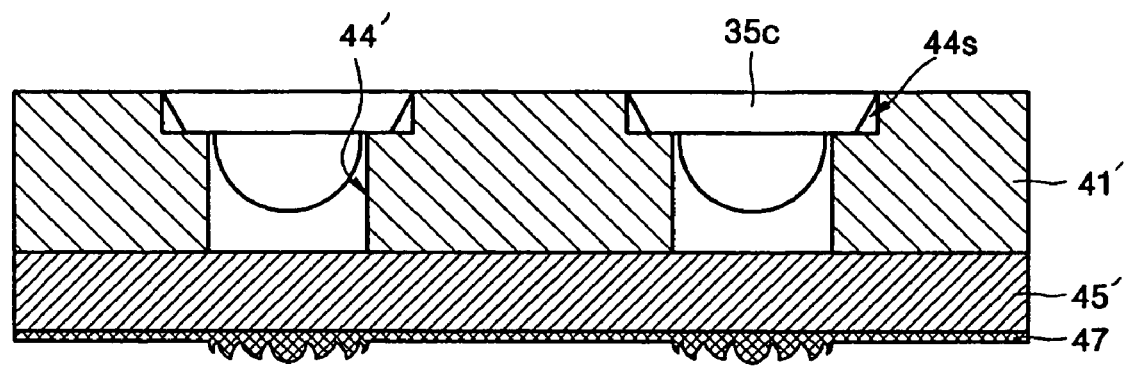

FIGS. 6A through 6E are cross-sectional views illustrating a method of manufacturing an array of diffractive lenses, that is, diffractive optical element (DOE) lenses, using an ultraviolet (UV) embossing process, according to an exemplary embodiment of the present invention. FIG. 6E illustrates a method of aligning a diffractive lens and a refractive lens.

FIG. 6A illustrates a lens holder array 40 manufactured through the processes of FIGS. 4A through 4E. Lens holders in the lens holder array 40 may be the lens holders 53a of FIG. 5A. The lens holder array 40 includes a substrate 41' having a hole array and a bottom plate 45' that forms bottom surfaces of holes of the substrate 41'. To align the lens holder array 40 with a DOE lens, align marks 42a and 42b (shown in FIGS. 4B through 4E) of the substrate 41' may be used, or extra align marks (not shown) may be formed in the bottom plate 45'.

As shown in FIG. 6B, an upper surface of the lens holder array 40 is coated with a fused UV curing material 47 using spin-coating, and a polymer mold 49 having the diffractive surfaces 48, which form DOE lenses, is located over the fused UV curing material 47. Preferably, but not necessarily, the UV curing material 47 is a glass having a diffractive index of 1.5 or greater and an internal light transmissivity of 95% or greater. Also, preferably, but not necessarily, the UV curing material 47 is highly adhesive, is easily attachable to and detachable from the polymer mold 49, and is not sensitive to a diffractive index change depending on a temperature change. In an exemplary embodiment, the UV curing material 47 must harden when receiving UV with a wavelength band of 200 to 300 nm. The polymer mold 49 is disposed over the UV curing material 47 such that the diffractive surface 48 faces a hole 44'. The diffractive surface 48 is formed to have a shape of a Fresnel lens so as to perform both a focusing function and a color aberration removing function.

As shown in FIG. 6C, the polymer mold 49 is pressed down on the UV curing material 47 so that the UV curing material 47 is molded to have the same shape as the diffractive surface 48. Preferably, but not necessarily, the polymer mold 49 and the UV curing material 47 are each formed of a transparent material with a high light transmissivity. The UV curing material 47 is hardened by applying UV to an upper surface of the polymer mold 49. In FIG. 6D, the polymer mold 49 is detached from the UV curing material 47, so a plurality of desired DOE lenses 47a are aligned on the UV curing material 47.

In FIG. 6E, micro-lenses 35c are aligned and bonded to a structure in which the DOE lenses 47 and the lens holder array 40 are combined. The lens holders in the lens holder array 40 may be the lens holders 53b or 53c of FIG. 5B or 5C. The micro-lenses 35c are inserted into the lens holes 44' of the substrate 41' and bonded thereto using an adhesive. The micro-lenses 35c are formed using a machining process as illustrated in FIGS. 3A through 3B. In contrast with the micro-lens 35a of FIG. 3C, the micro-lens 35c has aslant right and left sides such that damage of the right and left sides when being inserted into the hole 44' can be reduced. An adhesive is injected onto step portions 44s, on which the micro-lenses 35c are seated, to firmly fix micro-lenses 35b to the substrate 41'.

Diffractive lenses (i.e., DOE lenses) may be manufactured using a nano-imprinting technique instead of an UV embossing process as illustrated in FIGS. 6A through 6D. The nano-imprinting technique can easily produce a nano-pattern in large quantities and provides a high process yield. This will be described in greater detail with reference to FIGS. 7A through 7D.

Figure 7A:
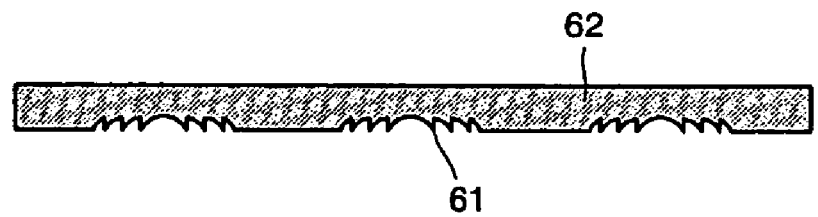
FIGS. 7A through 7D are cross-sectional views illustrating a method of manufacturing a diffractive lens using a nano-imprinting technique, according to an exemplary embodiment of the present invention.
Figure 7B:
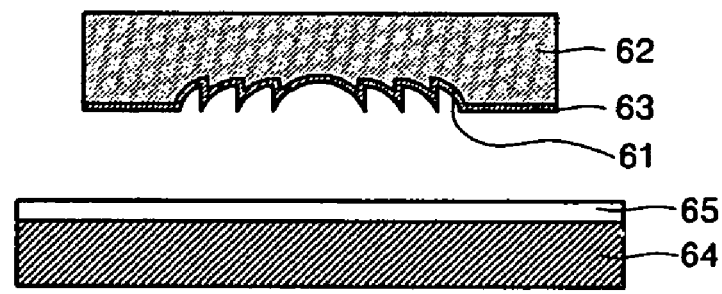

Referring to FIG. 7A, a template 62 having a diffractive lens pattern, that is, diffractive surfaces 61, is formed. As shown in FIG. 7B, the template 62 having the diffractive surfaces 61 is placed over a substrate 64, in which a diffractive lens is to be formed. The substrate 64 is coated with a polymer 65. The substrate 64 may be a silicon substrate, a quartz substrate, or an alumina substrate. Thermoplastic resin, such as polymethlmethacrylate (PMMA), is generally used as the polymer 65 formed on the substrate 64. The template 62 is formed of a material having a high light transmissivity, and a fused UV curing material may be used as the polymer 65. Preferably, but not necessarily, pretreatment is performed to form an isolation layer 63 on the diffractive surfaces 61 to easily separate the template 62 from the polymer 65 on the substrate 64.

Figure 7C:
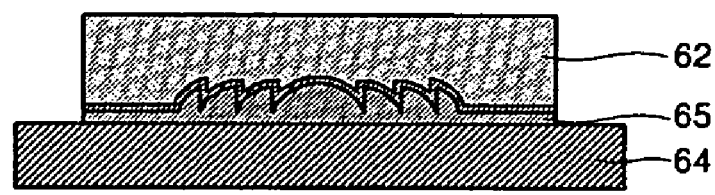

As shown in FIG. 7C, the template 62 is pressed down on the substrate 64 so that the diffractive surface 61 formed on the template 62 is imprinted on the polymer 65 without change. Since the template 62 and the polymer 65 are each formed of a material having a high light transmissivity, the polymer 65 is hardened by UV rays that penetrate through the template 62 while being pressed down.

Figure 7D:
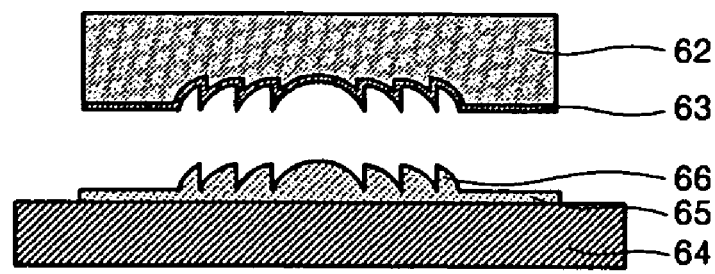

As shown in FIG. 7D, when the template 62 and the substrate 64 are separated from each other, a diffractive lens 66 formed on the polymer 65 can be obtained. When the template 62 having a plurality of diffractive lens patterns is used, an array of the diffractive lenses 66 can be easily obtained. In other words, a diffractive lens array can be directly be transcribed on the substrate 65 through this process.

A hybrid lens manufactured using the above-described embodiment of the present invention may be composed of a refractive lens with a plane oriented toward a disc and an aspherical curved surface such as to serve as an objective lens. When light emitted from a light source is incident upon the objective lens, the light is primarily refracted by a diffractive surface of the objective lens and secondly refracted (i.e., focused) by the refractive lens such as to form a fine optical spot which is almost a diffraction limit. Hence, a refraction (which is for focusing) burden on the refractive lens is reduced, and a burden to manufacture a lens with a high numerical aperture is reduced.

Provided is a method of simply manufacturing a hybrid lens composed of a refractive lens and a diffractive lens and an array of hybrid lenses (i.e., a micro-lens array) using an existing machining process and an existing micro-fabrication process. Also, in an embodiment, power is dispersed to the refractive lens and the diffractive lens, thereby facilitating the manufacture of the diffractive lens using a machining process. Furthermore, since the method can use both a low refractive material and a high refractive material in contrast with a conventional lens, a light micro-lens having a high refraction while keeping a numerical aperture similar to that of the convention lens can be manufactured.

As described above, a hybrid lens capable of dispersing power and correcting a color aberration is manufactured using a machining process, a micro-fabrication technique, an UV embossing technique, or a nano-imprinting technique. Therefore, a hybrid lens including a refractive lens and a diffractive lens and an array of the hybrid lenses can be easily manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a micro-lens, the method comprising:

molding at least one first lens using a compression technique;

producing a lens holder including a hole on which the first lens is seated and a second lens, the second lens being formed on a bottom surface of the lens holder; and combining the first and second lenses by aligning the first and second lenses in the hole of the lens holder.

2. The method of claim 1, wherein the molding of the at least one first lens comprises:

preparing a mold having the same surface shape as a shape of the first lens; and molding the first lens by pressing down a first lens forming material on the mold.

3. The method of claim 2, wherein the first lens has one surface which is spherical or aspherical and another surface which is plane.

4. The method of claim 1, wherein the production of the lens holder comprises:

forming a first etching area by coating an upper surface of a substrate with a photoresist and by patterning the photoresist;

forming the hole by coating a bottom surface of the substrate with a photoresist, by patterning the photoresist, and by forming a second etching area leading to the first etching area; and bonding a bottom plate to the bottom surface of the substrate to form a bottom surface of the hole.

5. The method of claim 4, wherein in the production of the lens holder, align marks are formed on the upper surface of the substrate and in the bottom plate.

6. The method of claim 4, wherein the production of the lens holder further comprises polishing the bottom plate after the bottom plate is bonded to the substrate.

7. The method of claim 4, wherein the production of the lens holder comprises:

forming the second lens by coating the bottom plate with a UV curing material, by pressing down the UV curing material on a polymer mold, and hardening the UV curing material with applied UV rays; and inserting the first lens into the hole such that the first and second lenses are aligned along an optical axis.

8. The method of claim 7, wherein the UV curing material has a diffractive index of no less than 1.5.

9. The method of claim 7, wherein the UV curing material has a light transmissivity of no less than 95%.

10. The method of claim 4, wherein the production of the lens holder comprises:

forming the second lens by coating the bottom plate with a polymer, by pressing down the polymer on a template having a diffractive surface, and hardening the UV curing material with applied UV rays; and inserting the first lens into the hole such that the first and second lenses are aligned along an optical axis.

11. The method of claim 4, wherein the bottom plate is formed of transparent glass.

12. The method of claim 4, wherein the second etching area is on the bottom surface of the substrate.

13. The method of claim 1, wherein the production of the lens holder comprises:

preparing a lens holder mold including upper and lower molds;

injection molding the lens holder having the hole by implanting thermoplastic resin into a space between the upper and lower molds; and forming the second lens on a surface opposite to a surface on which the hole is formed.

14. The method of claim 13, wherein the upper mold of the lens holder includes a step portion on which the first lens is seated.

15. The method of claim 1, wherein the production of the lens holder comprises:

preparing a lens holder mold including an upper mold and a lower mold that has a surface matching a surface of the second lens; and injection molding the lens holder by implanting thermoplastic resin into a space between the upper and lower molds.

16. The method of claim 1, wherein the first lens is a refractive lens.

17. The method of claim 1, wherein the second lens is a diffractive lens.

18. The method of claim 1, wherein the first and second lenses are aligned along an optical axis in the hole of the lens holder.

* * * * *